United States Patent [19]

Moen et al.

[11] Patent Number: 5,965,674
[45] Date of Patent: Oct. 12, 1999

[54] PROCESS FOR THE PRODUCTION OF POLYOLEFINS IN AN AUTOCLAVE REACTOR

[75] Inventors: Oivind Moen, Sannidal; Mangor Lien; Lars Bjornar Lyngmo, both of Stathelle; Kurt Strand, Saupstad; Havard Nordhus, Tiller; Peter Singstad, Trondheim; Jan Kjeldstad, Kolbotn, all of Norway

[73] Assignee: Borealis Holding A/S, Lyngby, Denmark

[21] Appl. No.: 08/663,142

[22] PCT Filed: Dec. 12, 1994

[86] PCT No.: PCT/NO94/00201

§ 371 Date: Jul. 24, 1996

§ 102(e) Date: Jul. 24, 1996

[87] PCT Pub. No.: WO95/16517

PCT Pub. Date: Jun. 22, 1995

[30] Foreign Application Priority Data

Dec. 13, 1993 [NO] Norway .................................... 934585

[51] Int. Cl.⁶ ....................................................... C08F 2/04
[52] U.S. Cl. .................................. 526/61; 526/59; 526/88
[58] Field of Search .................................................. 526/61

[56] References Cited

U.S. PATENT DOCUMENTS

| | | |
|---|---|---|
| 3,057,840 | 10/1962 | Pollock . |
| 3,299,033 | 1/1967 | Douglas . |
| 4,008,049 | 2/1977 | Clemmer et al. .......................... 23/288 |
| 4,012,573 | 3/1977 | Trieschmann et al. . |
| 4,271,280 | 6/1981 | Tomura et al. . |
| 5,242,999 | 9/1993 | Takakarhu et al. ........................ 526/61 |

FOREIGN PATENT DOCUMENTS

| | | |
|---|---|---|
| 0 094 208 A2 | 11/1983 | European Pat. Off. . |
| 0 240 024 A2 | 7/1987 | European Pat. Off. . |
| 16 20 947 | 5/1970 | Germany . |
| 26 11 405 | 9/1977 | Germany . |
| 1347361 | 2/1974 | United Kingdom . |
| 1538633 | 1/1979 | United Kingdom . |

OTHER PUBLICATIONS

Singstad et al., "Multivariable Non–Linear Control of Industrial LDPE Autoclave Reactors," American Control Conference, Chicago, Jun. 1992.

Primary Examiner—David W. Wu
Attorney, Agent, or Firm—Kirkpatrick & Lockhart LLP

[57] ABSTRACT

An improved process for the production of polyolefins in an autoclave reactor having several reaction zones operated at a pressure of 100 to 300 MPa and a temperature of 100 to 300° C. is disclosed. Dunng operation, temperatures are measured continuously inside the autoclave reactor at specific points distributed along the reactor length, each of said measured temperatures is compared with a corresponding preset temperature and the detected deviation between each pair of preset and measured temperatures is used in regulating the amount of monomer and initiator fed into the autoclave through several feed inlets distributed along the reactor length, in order to minimize the temperature deviations and thus obtain an improved control of the polymerization process.

19 Claims, 5 Drawing Sheets

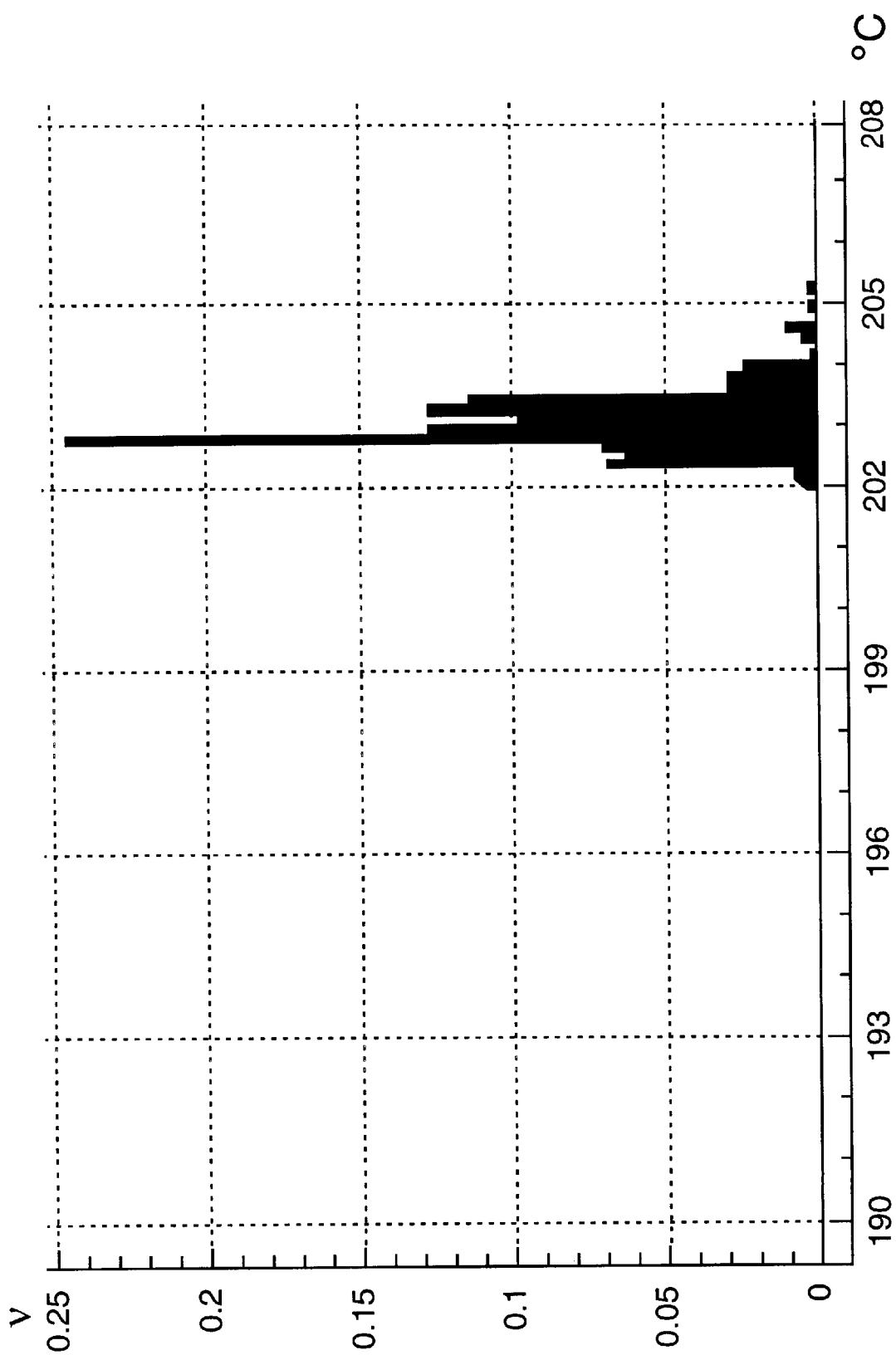
FIG. 4.1

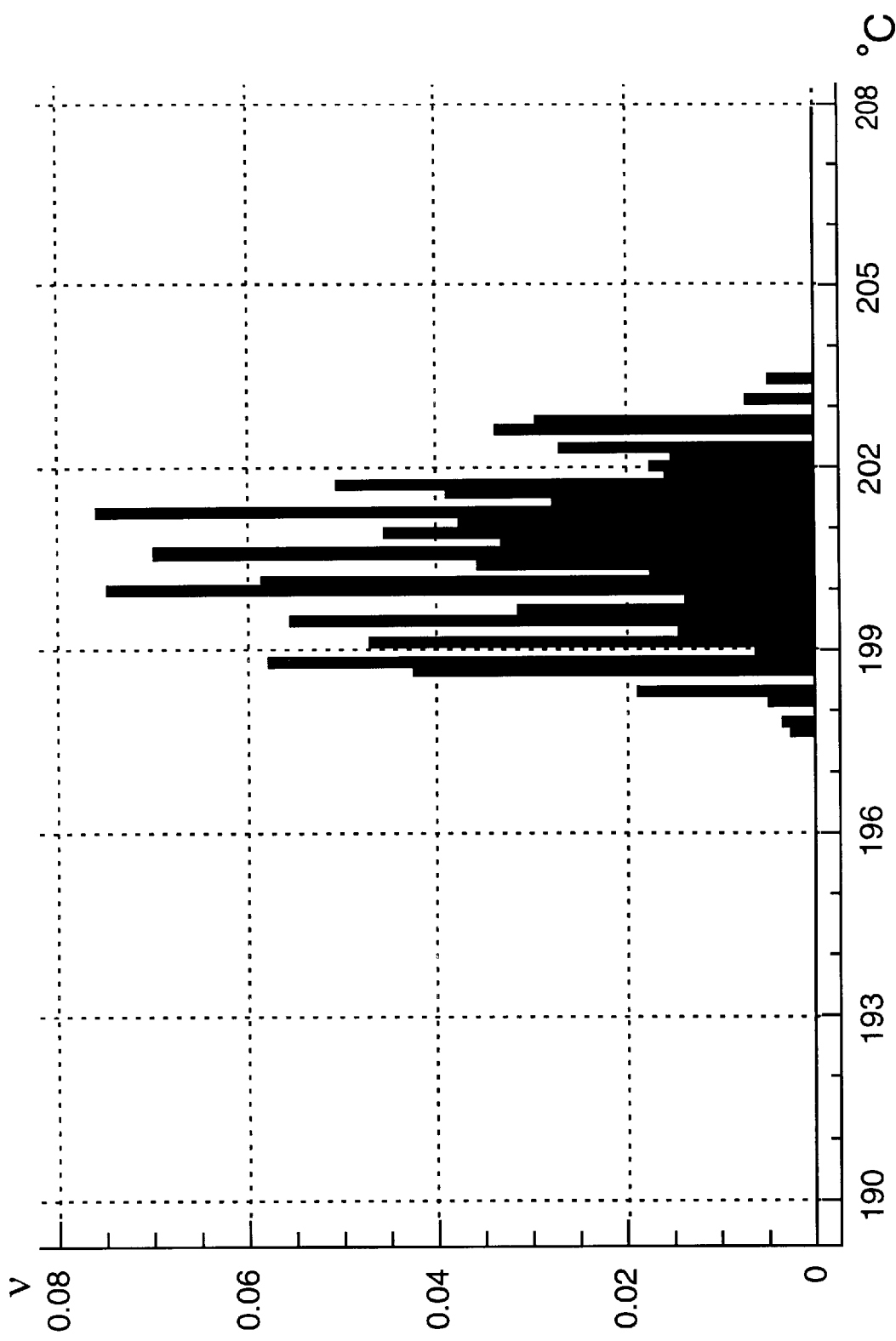
FIG. 4.2

PROCESS FOR THE PRODUCTION OF POLYOLEFINS IN AN AUTOCLAVE REACTOR

TECHNICAL FIELD

The present invention relates to a process for the production of olefin polymers in an autoclave reactor at high pressure and moderate temperature. In particular the present invention relates to a process for the production of polyethylene homopolymers and copolymers having low and medium densities by a controlled feeding of monomer and initiator into the reactor at a number of inlet points along the reactor.

The polymerization of ethylene at a high pressure, i.e. from 100 to 300 MPa, and a moderate temperature, i.e. from 100 to 300° C., into polyethylene is performed by a free radical polymerization process. The polymerization of ethylene or a mixture of ethylene with other olefins is performed by using an initiator having a suitable decomposition rate at the given temperature conditions. Since polymerization reactions are exothermal, the temperature in the reactor must be kept under strict control.

BACKGROUND ART

In prior art reaction systems the reaction temperature inside the reactor is controlled by regulating the amount of added initiator, or by providing indirect cooling by means of cooling pipes.

GB Patent No. 1,538,633 teaches a high pressure process for polymerizing monomer comprising ethylene in a first and second autoclave reaction zones arranged in series, which process is performed with a reduced temperature in said first zone in order to obtain final products having improved optical properties. The average amount of monomers fed to the first part of the reactor is reduced, thus obtaining an improved distribution of the polymerization reactions along the reactor. The temperature is controlled by regulating the introduced amount of initiator.

U.S. Pat. No. 3,299,033 discloses a method used in a high pressure ethylene polymerization process to provide a substantially uniform feeding rate of initiator into the reactor by means of a temperature or pressure controlled valve arranged in the feeding line. The main purpose of the invention is to smooth out the variations in the amounts of initiator delivered by the piston pumps used for feeding the initiator, as well as smoothing out the variations caused by pressure fluctuations in the reactor. The initiator is mixed with ethylene to achieve improved mixing.

U.S. Pat. No. 4,012,573 teaches a method of removing heat from polymerization reactions of monomers in the gas phase in a reactor by removing a portion of the gaseous monomers, liquefying said monomers and regulate the rate at which the liquid is fed back to the reactor, whereby the temperature and pressure inside the reactor are regulated.

DE Patent No. 2,611,405 teaches the introduction of cooling pipes into the reactor to remove reaction heat.

DE Patent No. 1,620,947 teaches the conveying of cold ethylene through a heat exchange unit mounted inside the reactor. The cooling effect of the cold ethylene is used for indirect cooling of the reactor, and the prewarmed ethylene is fed to the reactor.

These patents do not suggest the use of any control system for regulating the amounts of initiator and monomer, alternatively cold monomer, fed directly into the reactor with the purpose of controlling the temperature inside the reactor.

Attempts which are made in the prior art to regulate the reacion temperatures within an autoclave reactor of relevant type by varying the amounts of introduced initiator often result in large temperature variations. In contrast thereto the present process for the production of olefin polymers in an autoclave reactor makes it possible to keep the reaction temperature within a predetermined range, i.e. with only minor deviations from a preset temperature. As a consequence thereof, the polymerization reaction rate can be controlled throughout the reactor length.

SUMMARY OF THE INVENTION

The present invention provides a process for the production of polyolefins, in particular ethylene homopolymers and copolymers of low and medium density, in an elongated autoclave reactor having several reaction zones operated at pressures from 100 to 300 MPa and temperatures between 100 and 300° C., in which process monomer and initiator are introduced into the reactor through several feed inlets distributed along the reactor length. In said process temperatures are measured continuously inside the autoclave reactor at specific points distributed along the reactor length, each of said measured temperatures is compared with a corresponding preset temperature and the detected deviation between each pair of preset and measured temperatures is used in regulating the amount of monomer and initiator fed into the autoclave through the feed inlets in order to minimize the temperature deviations.

BRIEF DESCRIPTION OF THE FIGURES

The accompanying drawings will illustrate the invention and facilitate the understanding thereof.

FIG. 4 shows two histograms representing reaction temperatures measured and recorded in a reactor zone.

DETAILED DESCRIPTION OF THE INVENTION

In a typical reactor intended for the production of polyethylene at high pressure by a free radical polymerization process, it is desirable that polymerization reactions take place in a greater part of the reactor length. To obtain this, monomer and initiator are fed into the reactor at several feed inlets along the reactor length. Consequently, the autoclave reactor will comprise a number of more or less overlapping reaction zones, and the proportion of the polymerization reactions taking place in each zone along the reactor is controlled by regulating the amounts of initiator and monomer fed to each such reaction zone.

Since the polymerization reaction is exothermal and strongly temperature-dependent, it is essential that the reactor temperature be kept under control. The process of the present invention allows such control by regulating both the amount of initiator and the amount of monomer fed to the reactor, as well as the temperature of the monomer.

Figure 2:
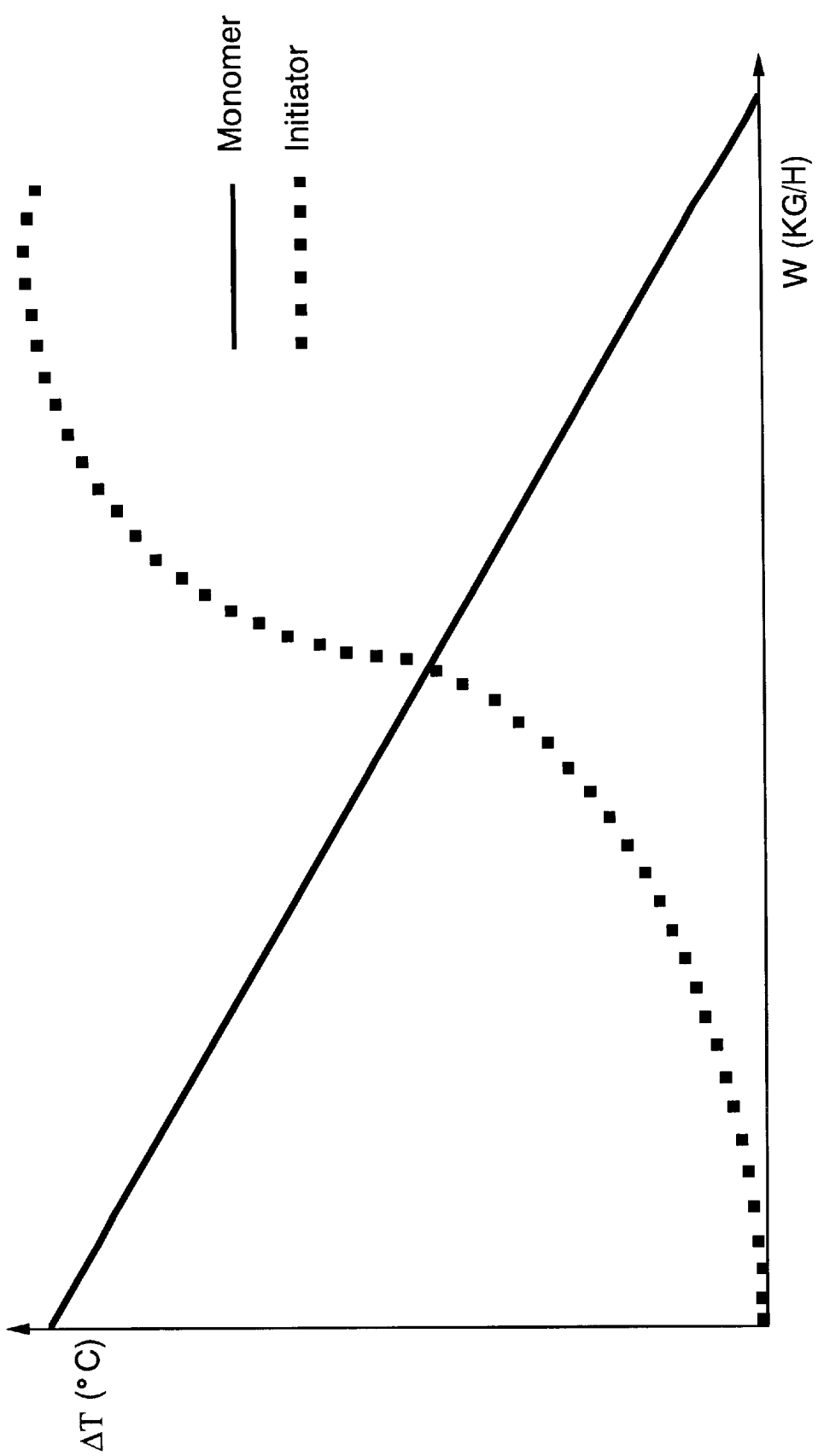
FIG. 2 illustrates how the amounts of monomer and initiator introduced into an olefin polymerization reactor influence the reaction zone temperature.

The initiator fed to the reactor must decompose before it can initiate the polymerization reactions. Said reactions generate heat which consequently cause a temperature increase. There exists a non-linear correlation between the amount of initiator fed to the reactor and the resulting increase in temperature within the reaction zone. Said effect is illustrated by the S-curved, dotted line in FIG. 2. Further, a linear relation exists between the amount of cold monomer fed into the reactor and the resulting temperature decrease within the reactor a linear relation exists. When the amount of cold monomer fed to the reactor is increased, the temperature will spontaneously drop as illustrated by the solid line. in FIG. 2.

The control system of the process according to the invention provides a means by which temperature fluctuations in an olefin polymerization reaction zone can be minimized. The control system also makes it possible to continue the polymerization reaction at lower feed gas temperatures than in similar prior art processes. By lowering the temperature of the monomers the heat dissipation increases. The monomers introduced into the reactor should therefore have a low, controlled temperature, preferably within a temperature range from $-10°$ C. to $100°$ C., more preferred from $0°$ C. to $100°$ C. Such low temperatures imply that the amount of heat needed to raise the monomer temperature up to the reaction temperature will be taken from the reactants and products within the reaction zone.

When the temperature within the reaction zone is low, the polymerization reaction may become unstable, which may lead to operational problems. However, the polymerization reaction can be maintained at a stable level even if the temperature of the feed gas is low if more active initiators are used. Moreover, this would result in an increase in the production capacity of the reactor whithout reducing any properties of the obtained final product.

Additionally, the present process also allows the reactor outlet temperature to be increased. Without a well-functioning control system, the reactor outlet temperature may increase to a too high value resulting in the polymerization reaction coming out of control. Ultimately, this may lead to a decomposition of the ethylene, the outcome of which would be a spontaneous pressure increase inside the reactor resulting in a reactor blow-out.

The present control system is based on measuring the temperatures at defined locations along the reactor length and comparing said measured temperatures with preset temperature values. The differences between measured and preset temperatures are processed in PID or PD control units, the signals from which are transmitted to a distribution control unit determining to which degree the corresponding amounts of monomer and initiator have to be increased or lowered.

The types of PID and PD control units employed in the present process are well known to those skilled in the art. A more detailed explanation of such control devices and how they function is therefore considered to be superfluous.

In the present process any temperature exceeding a preset value will result in an increased amount of cold monomer gas being fed into the reactor, resulting in a rapid cooling of the reaction zone. This effect cannot be achieved by merely regulating the amount of initiator introduced into the reactor.

The present autoclave reactor control system is segmented so as to comprise a number of separate, mutually dependent or independent, control loops, each of which is controlling one of the reaction zones into which the reactor is subdivided. Alternatively, one control loop may be controlling a group of such reaction zones. The segmentation of the control system will depend on how the reactor is subdivided into reaction zones. Reactors of current types are usually equipped with a mixing device, and a subdivision of the reactor into reaction zones would be determined by the circulation pattern created by the mixing device and the walls of the reactor, and by the manner in which the monomers being introduced into the reactor. The circulation pattern will depend i.a. on the inclination of the blades of the mixing device. Thus, one or more of the detected temperature deviations in one reaction zone or group of zones are used in adjusting the amounts of monomer and/or initiator fed into the reactor through one or more feed inlets in the respective zone or groups of zones.

Figure 1:
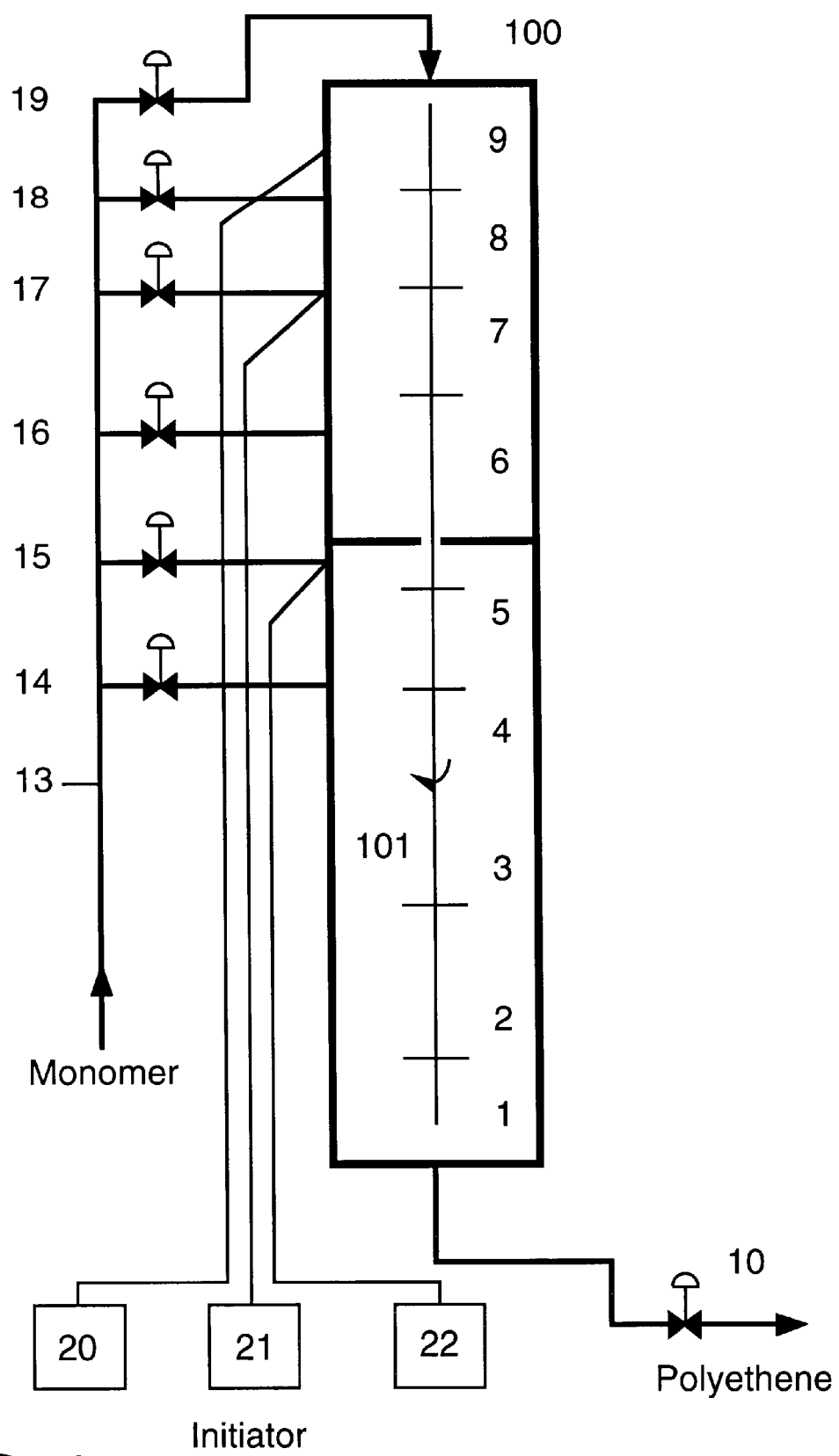
FIG. 1 shows an autoclave reactor for olefin polymerization comprising several monomer and initiator feed inlets along the reactor length.

A typical reactor, such as the one shown in FIG. 1, would provide a different mixing pattern within its upper part than within its lower parts. Because the circulation pattern varies throughout the upper part of the reactor, said upper part is usually considered to comprise several reaction zones. The uppermost monomer feed inlet is situated at the top of the reactor, and the remaining part of the monomer feed is introduced through separate feed inlets located along the side of the reactor, as shown in FIG. 1. In the present process, also the ratios between the amounts of monomer introduced into each reaction zone or group of zones are controlled in order to achieve a predetermined polymerization rate distribution along the reactor length.

Figure 3:
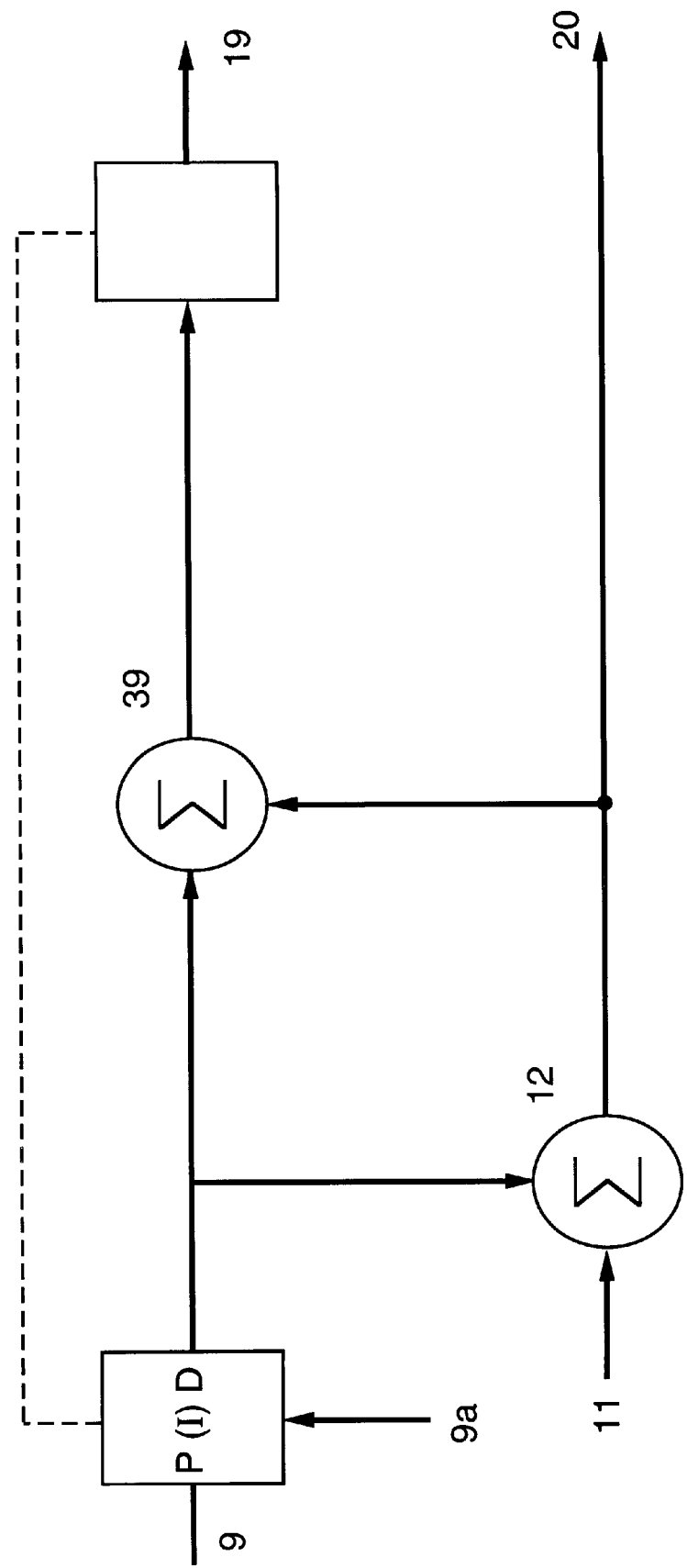
FIG. 3 is a flowsheet disclosing a part of a temperature based control system regulating the amounts of monomer and initiator fed to an olefin polymerization reactor.

Next, the invention will be explained in more detail with references to FIGS. 1 and 3. The autoclave reactor comprises a main reactor 100 provided with a mixing device 101 and a feed manifold 13 having branched-off lines, each equipped with a regulating valve 14–19. The pressure in the manifold 13 is kept at such a level that the pressure drop over each regulating valve 14–19 becomes as low as practically possible. The initiator is fed to the reactor by the use of pumps 20–22. The pressure inside the reactor is controlled by an outlet valve 10. The temperatures are measured at specific measure points 1–9. The desired temperatures inside the reactor are preset at desired values, which are based on experience, and which are also specified in the recipe for each particular polymer grade to be produced.

A typical reactor, such as the one shown in FIG. 1, may be subdivided into e.g. three reaction zones: a top zone, a middle zone, and a bottom zone. However, it is contemplated that some reactors may have more than three reaction zones, while others may have less.

The top zone comprises the temperature measure points 8 and 9. Monomer is fed into said zone through lines 18 and 19, and initiator is supplied by the use of a pump 20. The polymerization reaction in the top zone is controlled by a control system such as the one outlined in FIG. 3. The signals from each of the temperature measure points are processed in the respective PID or PD control units. For example, the temperature measured at point 9 is compared with a preset temperature 9a and the difference between the two temperatures is transmitted as a deviation signal to the summing unit 39. From the deviation signal is subtracted a time-delayed signal which progressively increases until it equals the original signal. Thus, the resulting gate opening in the monomer feed valve 19 will become proportional to a brief, time-differentiated temperature deviation value.

The temperature deviation signal is also transmitted to a summing unit 12 where it is added to a profile signal 11. The profile signal is a signal which regulates the feeding rate of the initiator. Said signal has a profile which secures that a desired ratio of the total amount of the initiator fed to the reactor is introduced into a given reaction zone. Hence, the profile signal is used to determine the ratios between the amounts of polymer to be produced in each of the reaction zones and consequently also the total amount of polymers produced. The signal from the summing unit 12 is scaled, and the resultant signal determines the amount of initiator to be fed to the reaction zone (by means of pump 20). The profile-determining signal is also used to regulate the pressure difference between the manifold and the reactor. In this case said signal is multiplied by a deviation signal which depends on the difference between a preset pressure drop over each of valves 14–19 and the actual measured pressure drop. Thus, the resulting profile signal 11 regulates both the desired production rate distribution along the reactor length, i.e. the amounts of monomer polymerized in the various reaction zones, and the pressure drops over the valves arranged in lines 14–19. For example, if the measured pressure drop is higher than the preset value, the profile signal 11 will automatically increase. The control system will then open the valves in lines 14–19, and the pressure drop over said valves will be reduced. Because there is a feed-back of the measured pressure drop signals to the profile signal 11, the measured pressure drop will automatically be adjusted and become equal to the preset pressure drop value. Thus, the amount of monomer fed to each reaction zone or group of zones is regulated because the pressure drop over the respective control valve is adjusted. The ratios between the amounts of polymer polymerized in each of the respective reaction zones are calculated on the basis of the actual amounts of initiator used in each particular zone.

The splitting of the temperature deviation signal has as a result that short-time deviations between the preset temperatures and the measured temperatures inside the reactor are reduced by adjusting the amount of monomer introduced into the reactor, while corrections due to long-term deviations are achieved by adjusting the amount of initiator introduced into the reactor.

The middle zone of the autoclave comprises temperature measure points 6 and 7, monomer feed inlets 16 and 17 with their respective valves, and an initiator feeding pump 21. This zone comprises control units analogous to those of the top zone, and the control loop for the middle zone will thus in principle be similar to the one for the top zone.

The bottom zone of the autoclave comprises five temperature measure points 2, 3, 4 and two monomer feed inlet lines 14 and 15 with their respective valves, and an initiator feeding pump 22. In principle, this control loop functions in the same way as the one described above, except that the temperature deviation signal adjusting the amount of monomer fed to the last monomer feed inlet is the sum of the four last temperature deviation signals 1–4, and that the temperature deviation signals adjusting the initiator feed is based on all five temperature deviation signals.

The number of reactor process variables that can be regulated obviously depends on the number of control organs regulating the reactor. In the reactor embodiment shown in FIG. 1, the control system comprise several measure points for temperature, one measure point for the total reactor pressure and one measure point for the manifold pressure, as well as two ratios utilized in regulating the production distribution within the reactor. Ideally, it would be desirable to control all these variables. However, the reactor is not sufficiently determined and the number of process variables to be controlled must therefore be reduced. This can be achieved by leaving out e.g. the temperatures at levels 2, 3 and 4 by not having any integrating units connected to the temperature control units at said levels. In other words, a certain stationary deviation is permitted. This will not influence the adjusting organs directly. The reactor may also be operated in such a manner that one of the two downstream valves 14 or 15, or both, will be closed, which will further reduce the degree of control by renouncing the integrating part of the controllers. The order of the control system is adapted to the degrees of freedom of the production process. By a reduction in the number of degrees of freedom of the process due to a control organ being in a state of saturation, the order of the control system will be reduced correspondingly. By "saturation" is meant that the particular control organ is in its extreme position, i.e. totally closed or totally open (0% or 100% open, respectively).

The non-linear correlation between the amount of initiator fed to the reactor and the resulting generated heat can be partly counteracted by using an initiator having an optimal behaviour within a specific temperature range, but it is not possible to avoid that a certain non-linear relation always will exist. This may be further compensated for by making the signal booster vary in proportion to the deviation between the preset temperature and the measured temperature.

The process described herein is not restricted to the control of autoclave reactors of the type exemplified herein only. Reactors in actual use may be of various designs and may have varying numbers of reaction zones and initiator and monomer feed inlets, and they may differ in these or other respects from the reactor described herein as an embodiment of the present invention. Instead of using valves in adjusting the monomer feeds, pumps may be used as well, and the initiator feeds may be adjusted by means of valves, without deviating from the concept of the present invention. The control system will function equally well when used in such modified reactor systems, as will be well understood by persons skilled in the art.

EXAMPLE 1 AND COMPARATIVE EXAMPLE 2

In an autoclave reactor used for the commercial production of polyethylene resins ethylene was polymerized to a low density polyethylene grade having a nominal melt flow index of 1.0. The reactor used was of the type described hereinbefore and outlined in FIG. 1. The reactor was equipped with a control system comprising three control loops, one for each of: the top reaction zone comprising monomer feed inlet lines 18 and 19, and temperature measure points 8 and 9; the middle reaction zone comprising monomer feed inlet lines 16 and 17, and temperature measure points 6 and 7; and the bottom reaction zone comprising monomer feed inlet lines 14 and 15, and temperature measure points 1, 2, 3, 4 and 5.

This reactor was used in both Examples 1 and 2. However, while the reactor used in Example 2 was equipped with a common prior art control system, the reactor used in Example 1 was provided with the improved control system of the present invention.

A production run which lasted more than 24 hours was performed. Nominal production parameters and actual, recorded values are listed in Table 1.

The autoclave pressure was 120 MPa both in Example 1 and Example 2. In Example 1 the autoclave was operated with a pressure drop over the regulating valves in the monomer feed inlet lines of approximately 10 MPa, while the operation of the poorer controlled reactor in Example 2 required a pressure drop of approximately 20 MPa. These pressure drops resulted in a temperature increase in the monomer feed of approximately 6° C. in Example 1 and approximately 12° C. in Example 2.

In Example 1 the recorded polymerization temperatures varied very little and they had an average value very close to the nominal values. In Example 2 in the two first zones of the reactor the polymerization temperatures were higher than the nominal values, while in the last zone the actual temperature was lower than the nominal value; in addition, the range of temperature variations were greater than in Example 1. The magnitude of variations in the reaction temperatures are demonstrated in FIG. 4. The temperatures measured at temperature measure point 5 (FIG. 1) during the production runs of Examples 1 and 2 are collected in two histograms shown in FIGS. 4.1 and 4.2, respectively. These histograms show that in Example 1 the nominal temperature (203° C.) was maintained very well and with small deviations, while in Example 2 the average temperature was approximately 200.5° C., i.e. 2.5° C. below the nominal value, and with fairly great temperature variations (the ordinates of the histograms are the frequency, v, of the occurring temperatures). The calculated standard deviation of the reaction temperature in FIG. 4.1 (example 1 according to the invention) is only 45% of the calculated deviation value in FIG. 4.2 (comparative example 2.).

The polymerization distribution along the reactor length is an important parameter used to optimalise the production. In Example 1 the ratios between the amounts of ethylene polymerized in each of the three reaction zones were equal to the nominal ratios 1:2:2. It was not possible to obtain these ratios in Example 2 where the ratios between the polymerized amounts were 1:2.5:2.5.

EXAMPLE 3 AND COMPARATIVE EXAMPLE 4

During the production runs in Examples 1 and 2 polymer samples were withdrawn at regular intervals and the melt flow index of each sample was measured according to the method of ASTM 1238.

The low density polyethylene obtained in Example 1 had a melt flow index of MFI=1.0±0.1 g/10 minutes, and the same polyethylene grade obtained in Example 2 had a melt flow index of MFI=1.0±0.3 g/10 minutes.

The substantial narrower range of variation in the melt flow index measured in Example 1 compared with Example 2 is a direct consequence of the improved control of the polymerization process.

TABLE 1

|  |  | Example 1 | Example 2 (Comparative) |
|---|---|---|---|
| Monomer feed, |  |  |  |
| manifold pressure | MPa | 130 | 140 |
| pressure drop over regulating valves | MPa | 10 | 20 |
| Monomer feed, |  |  |  |
| manifold temperature | ° C. | 50 | 50 |
| temp. increase over regulating valves | ° C. | 6 | 12 |
| Reactor pressure | MPa | 120 | 120 |
| Temperature, top reaction zone, |  |  |  |
| nominal | ° C. | 171 | 171 |
| recorded (average) | ° C. | 171 ± 1 | 172 ± 3 |
| Temperature, middle reaction zone, |  |  |  |
| nominal | ° C. | 171 | 171 |
| recorded (average) | ° C. | 171 ± 1 | 172 ± 3 |

TABLE 1-continued

|  |  | Example 1 | Example 2 (Comparative) |
|---|---|---|---|
| Temperature, bottom reaction zone, |  |  |  |
| nominal | ° C. | 203 | 203 |
| recorded (average) | ° C. | 203 ± 0.75 | 200.5 ± 2.5 |
| Polymerization reaction ratios bewteen the reaction zones |  |  |  |
| nominal |  | 1:2:2 | 1:2:2 |
| recorded (average) |  | 1:2:2 | 1:2.5:2.5 |
| Production rate of polyethylene | kg/h | 8480 | 8000 |

We claim:

1. A process for the production of ethylene polymers selected from the group consisting of homopolymers of low and medium density and copolymers of low and medium density, in an elongated autoclave reactor having several reaction zones operated at a pressure of 100 to 300 MPa and a temperature of 100 to 300° C., in which process monomer in a supercritical state and liquid initiator are introduced into said reactor through several feed inlets distributed along the reactor length, characterized in that temperatures are measured continuously inside the autoclave reactor at specific points distributed along the reactor length, each of said measured temperatures is compared with a corresponding preset temperature and the detected deviation between each pair of preset and measured temperatures is used in regulating the amount of process monomer and liquid initiator fed into the autoclave through the feed inlets in order to minimize the temperature deviations.

2. The process of claim 1, characterized in that all adjustments are performed by means of a set of separate control loops, each of which is controlling one of the reaction zones into which the reactor is subdivided, or alternatively controlling a group of such reaction zones.

3. The process of claim 1, characterized in that one or more of the temperature deviation values measured in one zone or a group of zones are used in adjusting the amount of process monomer introduced into the reactor through one or more feed inlets.

4. The process of claim 3, characterized in that the temperature deviation values measured in one zone also is used in adjusting the amount of the liquid initiator introduced into said zone.

5. The process of claim 1, characterized in that also the ratios between the amounts of process monomer introduced into each reaction zone or group of reaction zones are controlled to obtain a predetermined polymerization rate distribution along the reactor length.

6. The process of claim 1, characterized in that the amount of process monomer fed to each reaction zone or group of zones is regulated by adjusting the pressure drop over the respective regulating valve.

7. The process of claim 6, characterized in that also the total pressures inside the reactor is controlled.

8. The process of claim 1, characterized in that the order of the control system is adapted to the degrees of freedom of the production process such that a reduction in the number of degrees of freedom caused by a regulating organ being in its extreme position (saturation) will reduce the order of the control system correspondingly.

9. The process of claim 1, characterized in that the process monomer introduced into the reactor has a temperature within the temperature range from −10° C. to +100° C.

10. The process of claim 2, characterized in that one or more of the temperature deviation values measured in one zone or a group of zones are used in adjusting the amount of process monomer introduced into the reactor through one or more feed inlets.

11. The process of claim 2, characterized in that the ratios between the amounts of process monomer introduced into each reaction zone or group of reaction zones are controlled to obtain a predetermined polymerization rate distributed along the reactor length.

12. The process of claim 4, characterized in that the ratios between the amounts of process monomer introduced into each reaction zone or group of reaction zones are controlled to obtain a predetermined polymerization rate distributed along the reactor length.

13. The process of claim 5, characterized in that the amount of process monomer fed to each reaction zone or group of zones is regulated by adjusting the pressure drop over the respective regulating valve.

14. The process of claim 3, characterized in that the amount of process monomer fed to each reaction zone or group of zones is regulated by adjusting the pressure drop over the respective regulating valve.

15. The process of claim 4, characterized in that the order of the control system is adapted to the degrees of freedom of the production process such that a reduction in the number of degrees of freedom caused by a regulating organ being in its extreme position (saturation) will reduce the order of the control system correspondingly.

16. The process of claim 7, characterized in that the order of the control system is adapted to the degrees of freedom of the production process such that a reduction in the number of degrees of freedom caused by a regulating organ being in its extreme position (saturation) will reduce the order of the control system correspondingly.

17. The process of claim 14, characterized in that the order of the control system is adapted to the degrees of freedom of the production process such that a reduction in the number of degrees of freedom caused by a regulating organ being in its extreme position (saturation) will reduce the order of the control system correspondingly.

18. The process of claim 8, characterized in that the process monomer introduced into the reactor has a temperature within the temperature range from −10° C. to +100° C.

19. The process of claim 17, characterized in that the process monomer introduced into the reactor has a temperature within the temperature range from −10° C. to +100° C.

* * * * *